Jan. 15, 1952  J. K. NORTHROP ET AL  2,582,348
CONTROL SYSTEM FOR AIRCRAFT CONTROL SURFACES
Filed July 8, 1946  6 Sheets-Sheet 1

INVENTORS.
JOHN K. NORTHROP.
THOMAS A. FEENEY.
BY
Hubert E. Metcalf
Attorney Jan. 15, 1952 J. K. NORTHROP ET AL 2,582,348
CONTROL SYSTEM FOR AIRCRAFT CONTROL SURFACES
Filed July 8, 1946 6 Sheets-Sheet 4

INVENTORS.
JOHN K. NORTHROP.
THOMAS A. FEENEY.
BY
Herbert E. Metcalf
Attorney

Jan. 15, 1952     J. K. NORTHROP ET AL     2,582,348
CONTROL SYSTEM FOR AIRCRAFT CONTROL SURFACES
Filed July 8, 1946                    6 Sheets-Sheet 6

INVENTORS.
JOHN K. NORTHROP.
THOMAS A. FEENEY.
BY
Herbert E. Metcalf
Attorney

Patented Jan. 15, 1952

2,582,348

UNITED STATES PATENT OFFICE 2,582,348

CONTROL SYSTEM FOR AIRCRAFT
CONTROL SURFACES

John K. Northrop and Thomas A. Feeney, Los Angeles, Calif., assignors to Northrop Aircraft, Inc., Hawthorne, Calif., a corporation of California Application July 8, 1946, Serial No. 681,890

7 Claims. (Cl. 244—75)

The present invention relates to tailless airplanes and in particular to a means and method for controlling a tailless airplane to achieve full directional, lateral, and longitudinal control under takeoff, flying, and landing conditions.

One of the main problems in the successful operation of a tailless airplane is the problem of control. Tailless airplanes are limited to the trailing edge for substantially all of the control surfaces, and the trailing edge, of course, is limited in extent. Due to the short lever arms involved, particularly for longitudinal control, the control surfaces must necessarily be large, and in successful tailless airplanes substantially all of this trailing edge is used for control purposes. Several methods have been proposed to obtain effective use of the limited trailing edge, such as, for example, the use of elevons which can be independently or simultaneously moved for pitch and roll control with separable drag rudder surfaces mounted on such elevons, as shown in the United States patent to McKellar, No. 2,173,538. Such arrangements, however, particularly in large tailless airplanes, do not always adequately compensate for large and relatively infrequent moments disturbing trim, because when the elevons are moved upwardly in unison, for example, to correct for a diving moment introduced by the lowering of the high lift flaps for takeoff or landing, such elevons are not in the most favorable position for maintaining lateral control or additional pitch control by the pilot. Furthermore, such elevon surfaces in a tailless airplane are usually the largest control surfaces used on the trailing edge, and contribute significantly to lift when in or close to their neutral position.

It has been found, therefore, highly advantageous to remove from the elevons the necessity for compensation of large trim-disturbing moments such as caused by the use of the high lift flap, and to transfer the necessary compensation from the main controls to special trim flaps at or close to the wing ends which can preferably, for conservation of the trailing edge surface, also carry separable rudder flaps. It has also been found highly desirable for the pilot to be able to move such trim flaps in a similar manner as elevons are normally moved by the pilot, and particularly to enable the pilot to move them by operation of a unitary secondary control operating in the same conventional control manner as the pilot's main elevon controls and to do so without disturbing simultaneous or independent operation of the other controls.

The trim flaps are preferably the outermost control surfaces and in consequence, in a sweptback wing such as is customarily used in tailless airplanes, are more effective to control pitch than the elevons, as their average lever arm will be longer. In consequence these trim surfaces can be smaller in area than the elevons and still be effective to control pitching moments. As they are smaller than the elevons, deflections of the trim flaps to control pitch do not decrease the lift as much as if the elevons were to be used to compensate for moments of the same magnitude.

Furthermore, the provision of two separate unitary pitch and roll control systems independently or simultaneously operable by the pilot provides a safety factor in that, in an emergency, if the pilot's main control should fail for any reason, roll and pitch control can be obtained by use of the pilot's trim flap control. Also for safety, it is preferred that the elevons and the trim flaps, when power operated, be power operated from different power sources and in the example to be described herein the elevons are normally hydraulically operated with electrical emergency operation, and the trim flaps electrically operated.

Psychologically, it is extremely important for the pilot that both roll and pitch control systems be unitary and operable by him by conventional and instinctive control movements. In this manner in special cases or emergencies, no time is lost by the pilot in shifting compensation of special pitch and/or roll moments from one system to the other.

Accordingly, among the objects of the present invention are:

(1) To provide a means and method whereby directional, lateral, and longitudinal control is produced under takeoff, flying, and landing conditions in the operation of tailless airplanes;

(2) To provide a unique means and method of trimming a tailless airplane without interfering with the normal operation of its directional, longitudinal and lateral controls;

(3) To provide two separate systems for lateral and longitudinal control with single directional control for tailless airplanes, both systems operable by the pilot either independently or simultaneously;

(4) To provide a means and method for balancing diving moments introduced by the use of large high lift flaps in a tailless airplane;

(5) To provide a means and method of fully utilizing the trailing edge of a tailless airplane for control purposes; and (6) To provide a simple and safe means and method for controlling tailless airplanes.

The present invention, in broad terms as to structure, comprises a tailless airplane having a pair of symmetrically positioned elevons, together with unitary primary pitch and roll control means operable by the pilot in a conventional manner for moving said elevons upwardly or downwardly either independently or simultaneously. The name elevon is a contraction of the words elevator and aileron, as the surfaces to which the name is applied perform both functions. There is also provided a pair of symmetricaly positioned trim flaps with a unitary secondary pilot operable control means for moving said trim flaps upwardly or downwardly, either independently or simultaneously for pitch and roll control, secondary unitary control means being operable by the pilot in conventional directions either independently or simultaneously with the primary pitch and roll control. Pilot operated means for directional control completes the normal flying controls. For takeoff and landing a high lift flap can be lowered by the pilot.

Broadly stated as to method, the present invention comprises the steps of controlling a tailless airplane in pitch and roll under normal flying conditions by pilot instigated movement of trailing edge surfaces using conventional control movements by the pilot, and then shifting the balancing out of special pitch and roll moments from the normally moved trailing edge surfaces by separate movements of different trailing edge surfaces also using conventional control movements by the pilot to remove trim moments from the first moved surfaces which can then be neutralized by the pilot.

The above advantages and objects of the present invention can be more readily understood by reference to the drawings which show in varying detail the control system of the present invention as utilized, for example, on a tailless airplane having a 172 foot wing spread, a wing area of about 4,000 square feet and powered by four 28-cylinder 3,500 horsepower engines each driving contra-rotating propellers, the airplane having a gross weight of about 140,000 pounds with a wing loading of 35 pounds per square foot and designed as described and claimed in the Northrop and Sears application, Serial No. 547,594, filed August 1, 1944, now U. S. Patent No. 2,412,646, issued on December 17, 1946.

Figure 1:
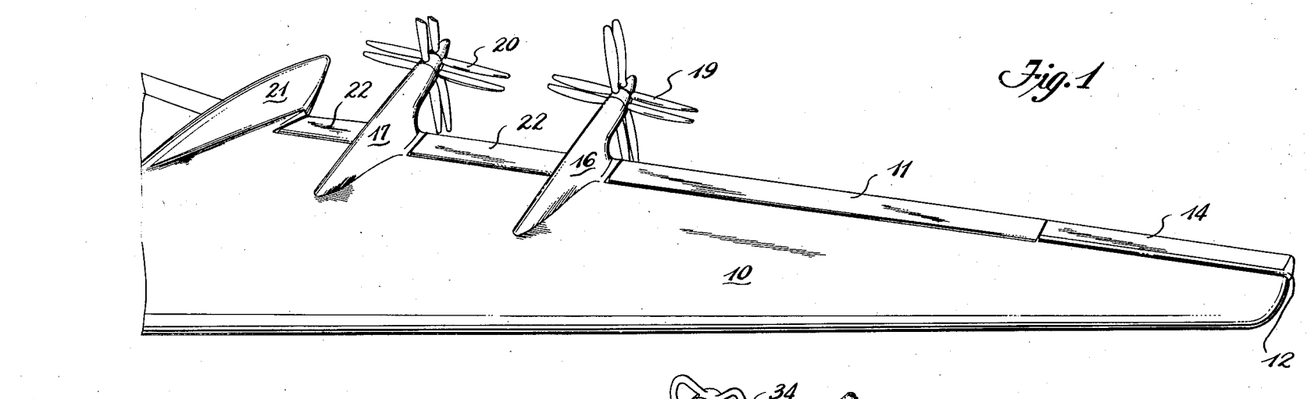
Figure 1 is a perspective view of one wing panel of the tailless airplane embodying the present invention.

Referring first to Figure 1 showing a wing panel, the airplane which is shown as illustrative of the present invention has a substantially triangular planform with an angular nose, and sweptback wing panels 10 of basic wing profiles which are preferably designed to have substantially zero center-of-pressure movement through all normal flight angles of incidence. This is illustratively and preferably, though not necessarily, accomplished by use of substantially symmetrical wing profiles from root to tip, giving substantially constant center-of-pressure positions one-fourth of the chord length back from the leading edge.

Each wing panel carries a trailing edge elevon 11, a trim flap 12 positioned along the trailing edge at the wing panel tip, and upper and lower separable rudder surfaces 14 and 15 (shown in Figure 6), mounted on the trim flap. Each wing panel also carries propeller shaft housings, an outboard shaft housing 16 and an inboard shaft housing 17 terminating in geared dual rotation pusher propellers 19 and 20, respectively, the engines being placed wholly within the wing section.

The wing may also be provided with a retractable nose wheel and with dual main wheels retractable into the wing section, the wheels forming, when extended, a "tricycle" landing gear, this gear not being shown.

In the center section of the airplane, positioned about the root chord, is provided a main cabin which may conveniently terminate rearwardly in a streamline fairing 21. In the center section adjacent the leading edge may be a pilot enclosure and a co-pilot enclosure, one on each side of the center line, as well as control windows, useful for navigation.

The sweepback measured along the 25% chord line is approximately 23°, and the dihedral angle, also measured along the 25% chord line, is positive and is substantially 1°, while the wing panels are provided with aerodynamic washout of 4°. The airplane thus has a low dihedral angle, low washout angle, and a moderate sweepback angle. The taper ratio in planform (ratio of root chord to tip chord) is 4:1, and the aspect ratio is approximately 7.4:1. The wing panels are tapered in both planform and thickness, the root section, taken in the plane of symmetry where the two wing panels join, having a thickness of 19% of the chord, while the tip section has a thickness of 18% of the chord. The taper ratio in thickness thus exceeds the taper ratio in planform.

No wing-tip stabilizing fins of any character are used. Yaw control is secured at all attitudes and speeds by the separable rudders 14 and 15 which are operated to produce drag and/or side force in the proper direction to cause a yawing moment.

Elevons 11 are so called because they combine the functions of elevator and aileron. Elevons 11 when moved in opposite directions for roll control operate in the manner of any ordinary trailing-edge ailerons to control the airplane in roll, and when moved together in the same direction, operate as elevators.

A high lift flap 22 is utilized on the under surface of each wing panel, and such flaps are placed along that portion of the trailing edge span inboard of the elevons, which terminate inwardly at the outboard shaft housings. Such flaps extend under the propeller housings and when lowered for landing exert a diving moment, which can be amply compensated for by raising the trim flaps to trim the airplane in the proper aerodynamic balance for landing. Being substantially further aft of the center of gravity of the airplane than are the high lift flaps (by reason of their location near the tips of the sweptback wings), the trim flaps 12 may be substantially smaller than the flaps and may still, because of their greater lever arm, produce a stalling moment sufficient to balance the diving moment caused by the extended flaps. And because they are substantially smaller than the flaps, their use in combination with the flaps results in a substantial net increase in lift.

The wing is structurally designed and loaded to locate the center of gravity of the airplane not over from substantially .01 to .03 of the mean aerodynamic chord of the wing forwardly of the aerodynamic center of the wing, meaning a designed longitudinal static stability of from .01 to .03. The illustrative airplane being assumed to have a mean aerodynamic chord of 315″, the distance between center of gravity and aerodynamic center is then typically from 3″ to 10″.

Figure 6:
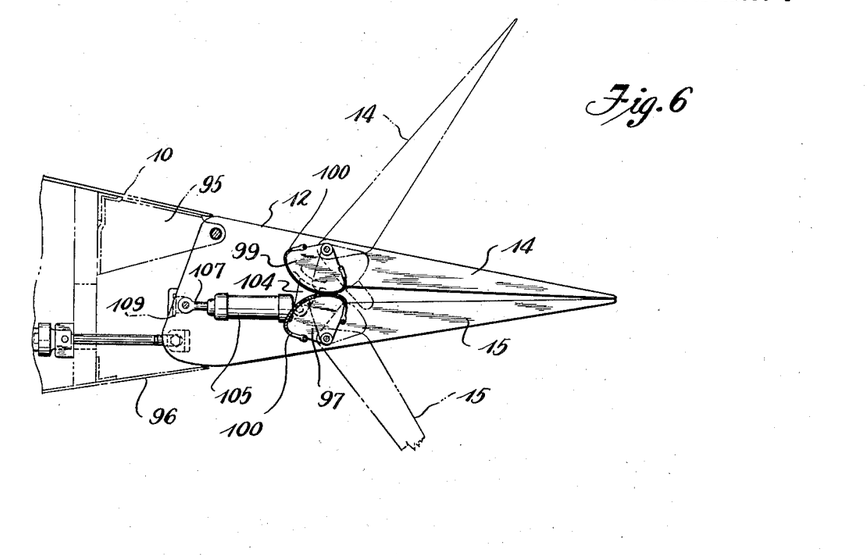
Figure 6 is a diagrammatic sectional view of a trim flap with the drag rudder flaps mounted thereon.

The upper and lower rudder surfaces, 14 and 15, respectively of the trim flaps are separable preferably along their entire length, these upper and lower surfaces being hinged to the trim flaps rearwardly of the trim flap leading edges, and capable of being symmetrically separated with respect to the trim flap on which they are carried. Thus when the rudder flaps are closed, the trim flap operates as a normal control surface. When the rudder flaps are open to any degree on one or both trim flaps the trim flaps are still capable of upward and downward movement and will still operate to produce upward or downward moments on the wing half on which they are mounted.

The control surfaces just described are all the control surfaces required for normal takeoff, flying, and landing conditions. By the term "controls" as used in this specification is meant control surfaces, and their pilot force application systems, inasmuch as it is understood that a minor type of control on any multi-engined airplane can be achieved by adjusting relative engine speeds. This latter type of control is not involved in the present invention. In addition, it is to be understood that it may be desirable to utilize the effect of slots adjacent the leading edge of the airplane that are opened at high angles of attack to reduce stalling tendencies. Such controls are also no part of the present invention.

Having described the type of control surfaces preferably utilized for directional, lateral, and longitudinal control of the airplane, the pilot control systems and the movement of the control surfaces as imparted to them by the pilot controls will next be described.

Figure 2:
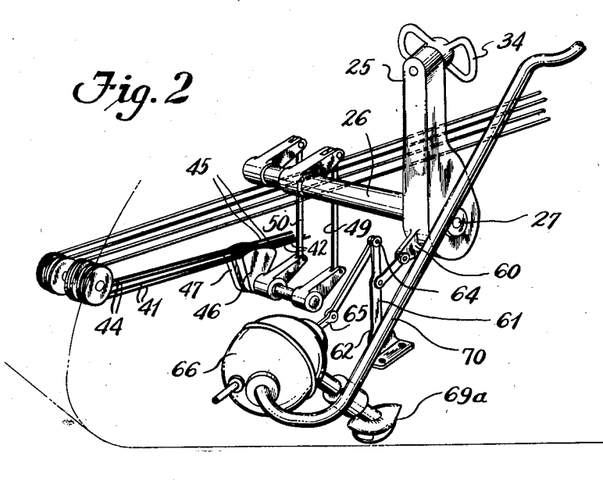
Figure 2 is a perspective view of the primary pilot control of the elevons.
Figure 3:
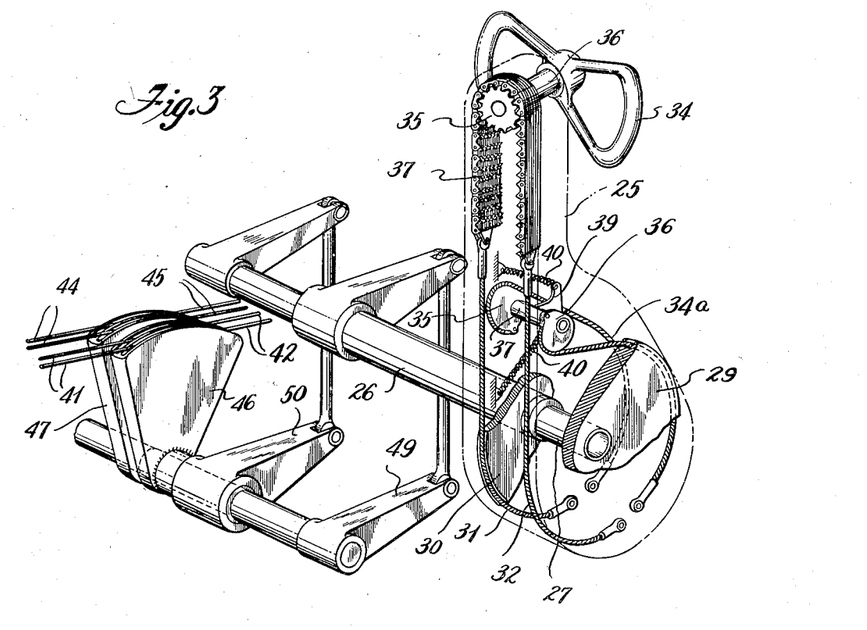
Figure 3 is a perspective view of the elevon control.

With particular reference to Figures 2 and 3, a pilot's primary control system for pitch and roll is provided wherein all piloting movements are made in a conventional manner, even though elevons are used. A primary control column 25 (Figure 2) extends upwardly from concentric main shafts 26 and 27 to which two drums are attached, respectively, as shown in Figure 3, which is drawn with the casing 25 removed, a left elevon drum 29 and a right elevon drum 30, around which pass a right wheel cable 31 and a left wheel cable 32, respectively, to be anchored to the respective drums about half way around. The drums are cut away in Figure 3 for clarity of illustration. Each drum can be individually rotated by these cables by a control wheel segment 34 mounted on top of the standard casing. Rotation of wheel 34 drives sprocket 35 through shaft 36, meshing with a chain 37 to which the right cable 31 is attached on one end, and the left cable 32 is attached on the other end. The drums are interconnected by interconnection cables 34a anchored to the drums, passing around substantially half of the drum, the right cable passing over and around a right interconnection cam 35, the left interconnection cable passing under and around a left interconnection cam 36, cams 35 and 36 being interconnected by shaft 37. Neutralizing forces are supplied by means of a bracket 39 fastened to shaft 37, each end of this bracket carrying aileron motion neutralizing springs 40 extending to the front wall of the primary column. Two activating cables 41 and 42 and 44 and 45 are connected to each of sectors 46 and 47, respectively, through linkages 49 and 50, respectively, and the activating cables are connected so that when the primary column is rotated on shafts 26 and 27 in a fore and aft direction both elevons will be moved upwardly and downwardly together, irrespective of their relative position with respect to each other, whereas turning the wheel segment 34 will move either elevon independently upwardly or downwardly, irrespective of the fore and aft position of the primary control standard. Thus the operation, as far as the pilot is concerned, of his primary controls for pitch and roll control is identical with standard airplane control practice, even though the same surfaces are used to produce both moments.

Figure 4:
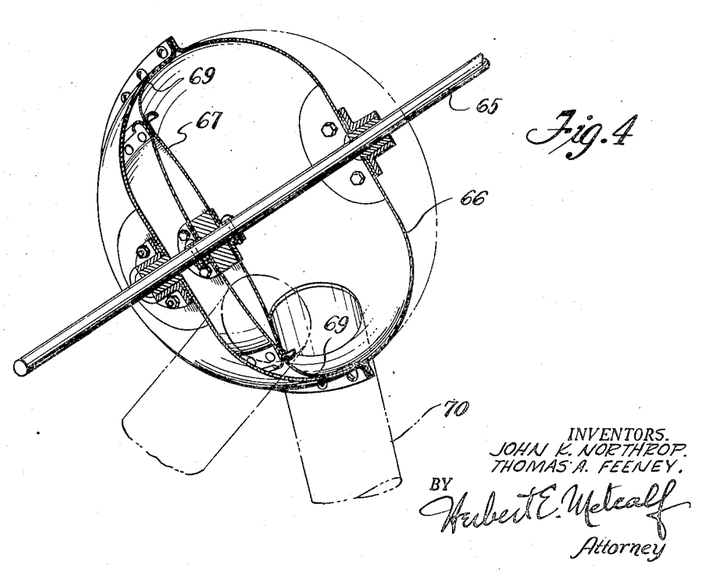
Figure 4 is a perspective view of a device for imparting "feel" to the elevon control.

Special means are provided to produce neutralization and control "feel" in elevator directions, as shown in Figures 2 and 4. Referring first to Figure 2, the pilot's elevon controls only are shown. The system therein illustrated is somewhat similar to that described and claimed in the pending application of Ashkenas, Serial No. 567,683, filed December 11, 1944, now U. S. Patent No. 2,559,817, issued on July 10, 1951. In the present instance a forwardly projecting bracket 60 is attached to the main pilot control column 25 which connects to lever 61 between its ends, one end 62 of which is fixed, but rotable, the other end 64 being attached to a rod 65. The actuating mechanism is shown in Figure 4. Here a roughly spherical casing 66 contains a diaphragm plate 67 attached to casing 66 by a cloth diaphragm 69, thus dividing the compartment. Diaphragm rod 65 passes through casing 66 and is fastened to diaphragm plate 67. One side of the diaphragm plate 67 is supplied with rammed air from a forwardly opening ram scoop 69a positioned on the lower wing surface as shown in Figure 2, and the other side of the diaphragm plate 67 is connected to static air pressure by a static pipe 70 opening on the upper wing surface. The differential pressure caused by the flight of the airplane places a pressure on the main pilot control when the main control is moved in either direction from neutral in elevator directions. This pressure provides a sense of airspeed feel to the elevator controls.

For a given displacement of the control column from neutral a restoring force will vary approximately with the square of the airspeed. At a given airspeed the restoring force on the control column will vary approximately linearly with column displacement. This type of feel has been provided primarily to give the pilot an indication of the acceleration to which he is subjecting the airplane. The system shown will give the pilot exactly the same number of pounds of control force per gravity unit of airplane acceleration that he would get in a conventionally controlled airplane of the same type and size. In addition, the device produces centering forces capable of overcoming system friction to the point of maintaining trim speed within normal tolerances.

Figures 5, 14:
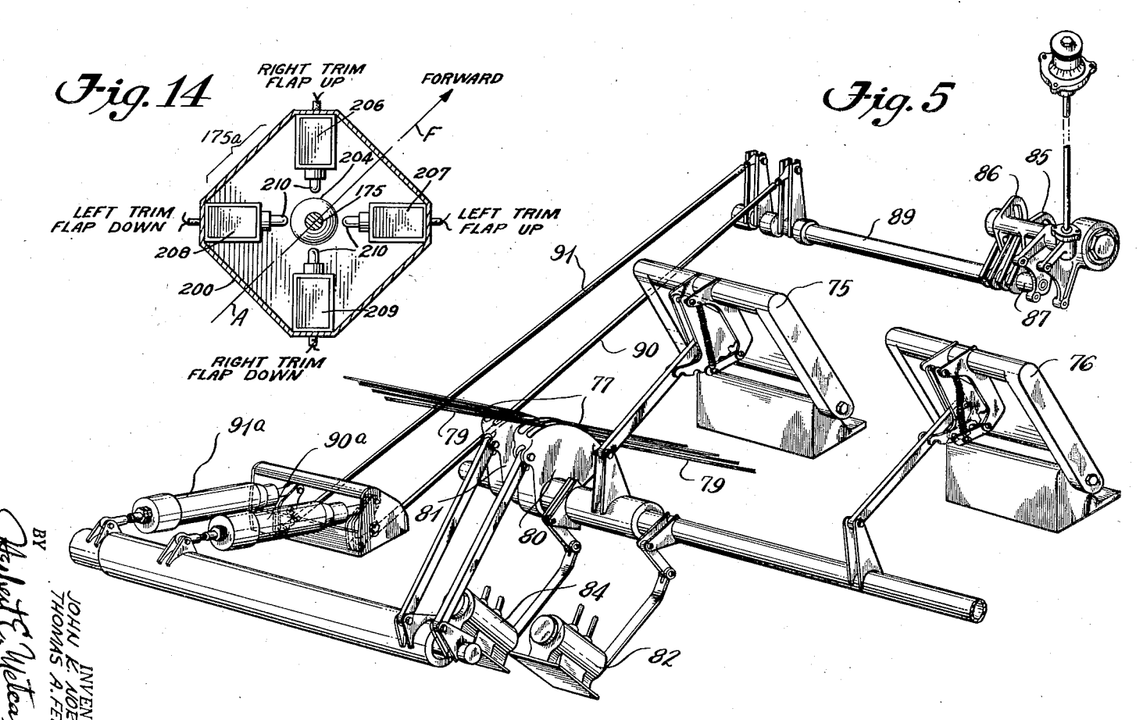
Figure 5 is a perspective view of the pilot's rudder control.
Figure 14 is a cross sectional view taken as indicated by the line 14—14 in Figure 13.

Directional control by the pilot is provided by right and left rudder pedals 75 and 76 operating rudder cables 77 and 79, respectively, through pulley segments 80 and 81, respectively, as shown in Figure 5. However, the rudder pedal assembly differs slightly from conventional practice in that each rudder pedal can be moved independently, i. e., the right and left rudder pedals are not interconnected. The rudder pedal assembly also includes a pair of hydraulic wheel brake cylinders 82 and 84, one connected to each pedal, and a rudder trim mechanism comprising right and left rudder cams 85 and 86, respectively, operating lever arms on shafts 87 and 89, respectively, which in turn through lever and rod linkages 90 and 91, respectively, adjust the rest position of the pedals, and consequently the separation of the rudder flaps through spring assemblies 90a and 91a, respectively.

Spring assemblies 90a and 91a are pre-loaded to a greater load than that required to overcome friction in the rudder control system. When the rudder trim mechanism is operated these spring assemblies act as solid rods moving the main rudder cable system. When a rudder pedal is displaced by the pilot the control force varies, due to the spring, directly with pedal position. Thus the stored energy in the spring will return the pedal to rudder closed, or rudder trim position.

Rudder cables 77 and 79 are connected by rudder sectors 80 and 81 respectively to open or close rudder surfaces 14 and 15. The rudder cables are led through the wing in conventional fashion into the trim flaps 12 along the axes thereof, so that when a trim flap is rotated only a slight twist is placed in the relative position of the rudder cables. This twist does not affect the operation of the control. The rudder cables are then led to a rudder operating servo-mechanism positioned inside the trim flap. This mechanism will next be described.

Figure 7:
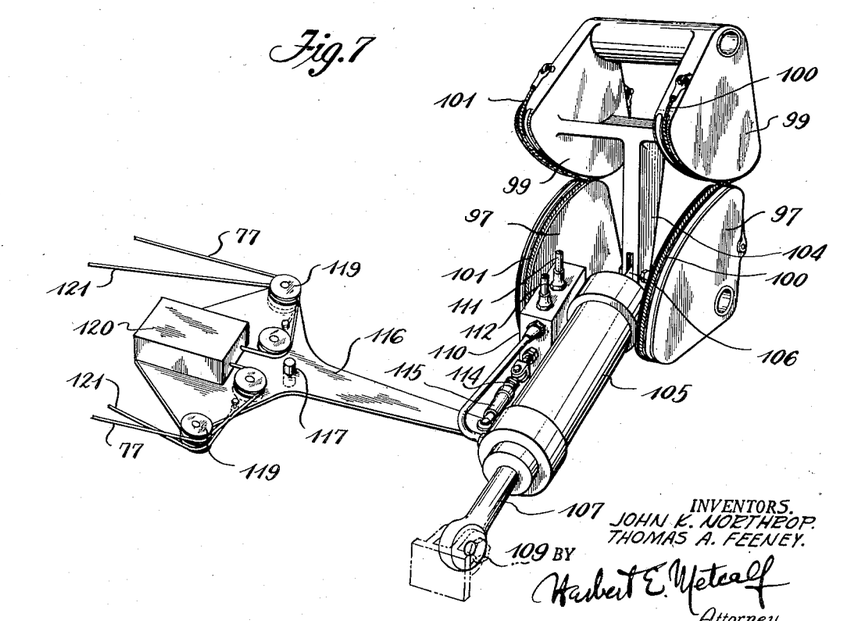
Figure 7 is a perspective view of the drag rudder actuating mechanism.

Referring to Figures 6 and 7 showing the rudder operating mechanism, it will be seen from Figure 6 that the trim flap 12 is hinged to the wing spar on brackets 95 close to its upper leading edge, with a forwardly projecting lower portion covered by a fairing edge 96 forming a continuation of the lower wing surface. Upper and lower rudder flaps 14 and 15 are hinged forwardly to the trim flaps, rearwardly of the leading edges of the trim flaps and are so hinged that the upper rudder flaps can be rotated upwardly through 60° and the lower surface rotated downwardly 60°. The two flaps are tied together by interconnect sector pairs 97 and 99 whose curved surfaces face each other and which are connected by crossed cables 100 and 101 as shown in Figure 7. The upper cable sector pair 99 are connected together with a bellcrank bracket and lever 104 to which a hydraulic cylinder 105 is attached by cylinder hinge 106 to bellcrank 104. A hydraulic rod and piston 107, the latter fitting inside cylinder 105, is attached to the trim flaps adjacent their leading edges by a piston rod hinge bracket 109. A servo-valve assembly 110 is attached rigidly to the cylinder 105, and this valve assembly is provided with a liquid pressure line 111 and a liquid return line 112. The valve assembly is operated by a valve rod 114 hinged to a spring-loaded cylinder 115, this cylinder in turn being hinged to a rudder cable bellcrank 116 mounted on rudder crank axle 117. The main rudder cables 77 pass over pulleys 119 on the bellcrank 116 and enter a tension regulator 120, also mounted on the bellcrank, as is the usual practice. Usually, two rudder actuating units are utilized for each pair of rudder flaps, a second actuating unit being operated by rudder interconnection cables 121 which operate the bellcrank arm for the other actuating unit when used.

In the operation of the rudders, the appropriate rudder pedal is pushed forward by the pilot, thereby moving bellcrank 116 and operating the servo-valve assembly to admit fluid under pressure into the hydraulic cylinder to open the flaps as shown by broken lines in Figure 6. When the rudder is returned to its normal position by rudder pedal spring 90 or 91 the pressure on the hydraulic piston is reversed to close the flaps. It will be noted in this respect that it is the cylinder and valve that move, whereas the rod and piston assembly is hingedly attached to the trim flap. By thus placing the valve assembly close to the cylinder, it has been found that hunting of the servo-mechanism is prevented due to the extremely short power control circuit. The servo-valve assembly adjustment is such that the rudder flaps will remain open in direct relationship to rudder pedal travel. The anti-hunting arrangement on the hydraulic servo-mechanism is no part of the instant invention, but is more fully described and claimed in the copending application of Feeney, filed April 27, 1948, Serial No. 23,567.

Figures 8, 9:
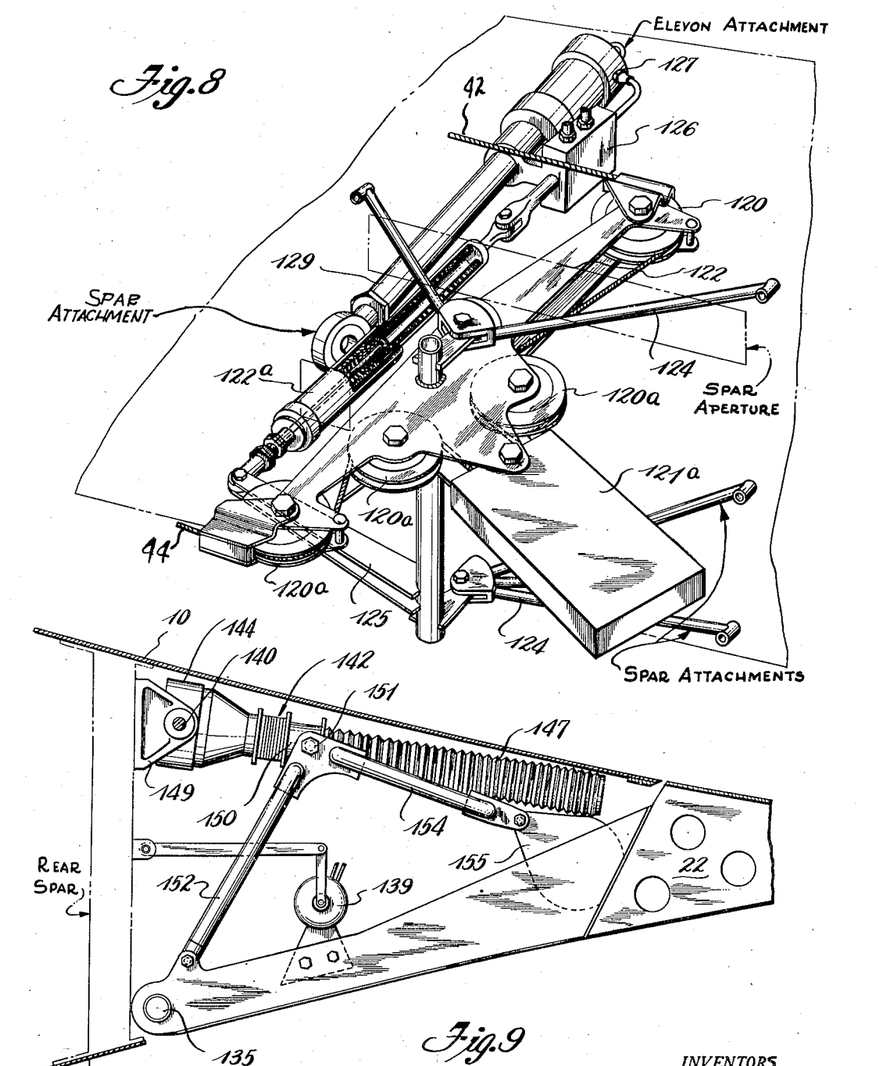
Figure 8 is a perspective view of the elevon actuating mechanism.
Figure 9 is a perspective view of a high lift flap jack screw.

The elevon operating mechanisms are basically the same as the rudder operating mechanism just described, and one is shown in Figure 8. Here again the elevon operating cables 42 and 44 pass over elevon cable pulleys 120a to enter a cable tension regulator 121a on an elevon bellcrank 122. The latter is supported on support spiders 124 attached to the rear spar of the airplane. A valve operating arm 125 of the bellcrank 122 is attached hingedly to a load release spring 122a which, in turn, connects with an elevon servo-valve assembly 126 attached rigidly to the elevon hydraulic cylinder 127, fastened to the elevon, the piston assembly 129 being hingedly attached to the rear spar of the main structure. Here also several operating units are preferably utilized, the operating cables for which, however, for safety, are duplicated all the way through to each elevon actuator. This type of connection, together with the pilot control as previously described, enables the elevons to be simultaneously or independently fully power operated by the pilot as desired.

With respect to load relief springs 122a this spring assembly is pre-loaded to a force greater than servo-valve friction; in consequence, under normal operation the spring does not function and the assembly acts as a solid rod. If the servo-valves are rigged out of position in relation to each other one valve will completely open before the other. Additional movement of the control will then compress the spring in the open valve control rod which will allow the other valve to open; thus full hydraulic power is obtained. When hydraulic power is off, the spring can be compressed, allowing full pilot control column and pilot control wheel travel. This spring will also limit valve rod loads, thus preventing damage to the hydraulic cylinder. An electrically operated emergency elevon operating system (not shown) may also be provided.

Having thus described the action of the rudders and the elevons, it will be seen that the controls described will satisfactorily control the airplane in normal flight. That is, the elevons with conventional pilot actuation of the control column will control the airplane in roll and in pitch and the rudder can be used to apply a unilateral drag, thus producing a directional control. However, both during take-off and in landing, it is desirable to use a high lift flap, which normally consists of a flap at the bottom surface of the trailing edge of the airplane, as described, which can be rotated downwardly to gain increased lift, as is well known in the art. The use of such high lift flap, particularly in a tailless airplane, will introduce a diving moment. In addition, in a multi-engine airplane, rolling moments can be introduced by failure of one or more engines, particularly unilateral failure of outboard engines. Such a diving moment as might be caused by the flaps and a rolling moment introduced by unilateral engine failure could, of course, be compensated for by the pilot by his manipulation of the elevons. However, such compensation is not always satisfactory, as before set forth. It is therefore highly desirable to transfer or shift balancing moments away from the normal controls. In consequence, the trim flaps which are farther to the rear of the center of gravity of the airplane than the elevons, due to sweepback, are operated by a secondary control in such a manner as to relieve the pilot of the necessity of compensating for special moments in pitch and roll by his main controls.

Figure 10:
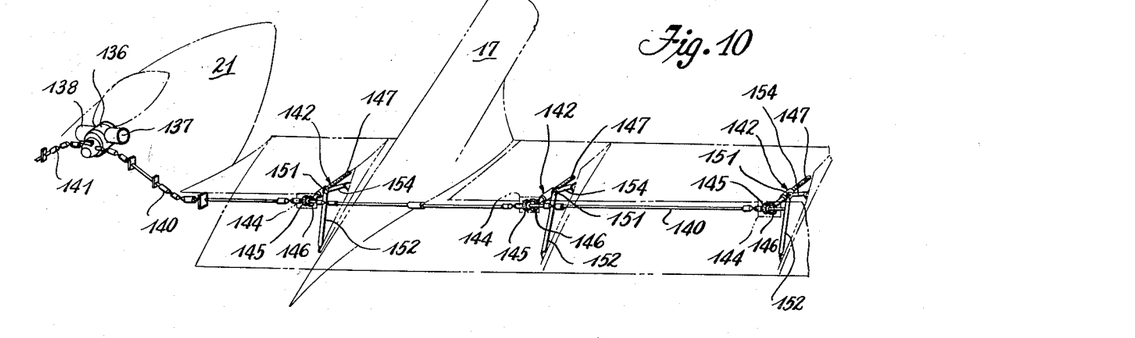
Figure 10 is a diagrammatic perspective view of the high lift flap operating mechanism.

Inasmuch as under normal takeoff and landing conditions the high lift flap is one device which introduces a special pitching moment, for which high lift flaps will be next described, by reference to Figures 9 and 10. In the case of the tailless airplane previously described, the high lift flaps are adjacent the center section of the airplane and on each side extend from the central streamlined fairing 21 underneath both propeller housings, terminating just outboard of the outboard housing. The outer ends of the high lift flaps adjoin the inner ends of the elevons. Each high lift flap is approximately triangular in section as shown in Figure 9, and is hinged to the airplane adjacent the lower wing surface on an axle 135. The high lift flaps are operated by a central power unit 136 comprising two motors 137 and 138 together with the customary brakes, gear reduction, transmission, limit controls, etc., together with a flap position transmitter 139 as shown in Figure 9. The two motors 137 and 138 are interconnected to differential gearing (not shown) which permits either motor alone to fully deflect the flaps in twice the normal time in event of failure of the other motor. The differential gearing transmits power into jack operating shafts or torque tubes 140 and 141, which extend along the rear wing spar to operate screw type actuators 142, preferably three being used.

Referring to Fig. 9 for description of the high lift flap actuators, the shaft 140 operates as a hinge for an actuator gear box 144 in which is positioned a driving gear 145 meshing with a bevel gear 146 driving jack screw 147, the actuator mechanism being held in place by bracket 149 attached to the rear spar of the airplane. A nut 150 is threaded on screw 147 and through nut pin 151 operates a driving truss, the front arm 152 of which connects to the flap 22 adjacent the flap hinge 135, and the rear arm 154 of which connects to flap 22 through truss bracket 155.

Figure 11:
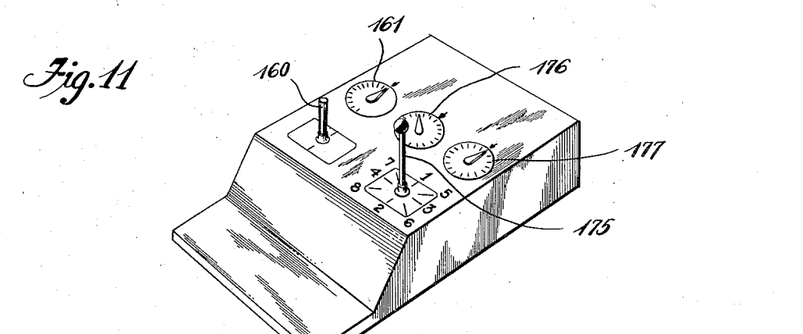
Figure 11 is a perspective view of the pilot's high lift flap control and secondary pilot control for the trim flaps.

As shown in Figure 11, adjacent the pilot and in a position to be easily reached by him preferably at one side of the pilot's seat, is a lift flap switch 160 for energizing the motors 137 and 138 to lower and raise the flap. Position transmitters 139 operate a dial 161 adjacent the high lift flap switch to indicate to the pilot the degree of downward rotation of the high lift flaps. The full downward travel of the high lift flap is 50°. It will thus be seen that for takeoff and landing purposes a very large section of the trailing edge of the airplane can be rotated downwardly under power, by the pilot.

To correct for the pitching moment caused by this flap rotation, as before stated and for other trim disturbances, a special trim flap actuating pilot control system is provided. This trim flap control system is assembled to be operated as a secondary pilot operable unitary control so that the airplane can be trimmed during takeoff and landing, or for compensation of other trim deficiencies that might occur in flight, such as engine failure or load shift, and the entire system is separately operable by the pilot. The trim flap actuators will first be described.

Figure 12:
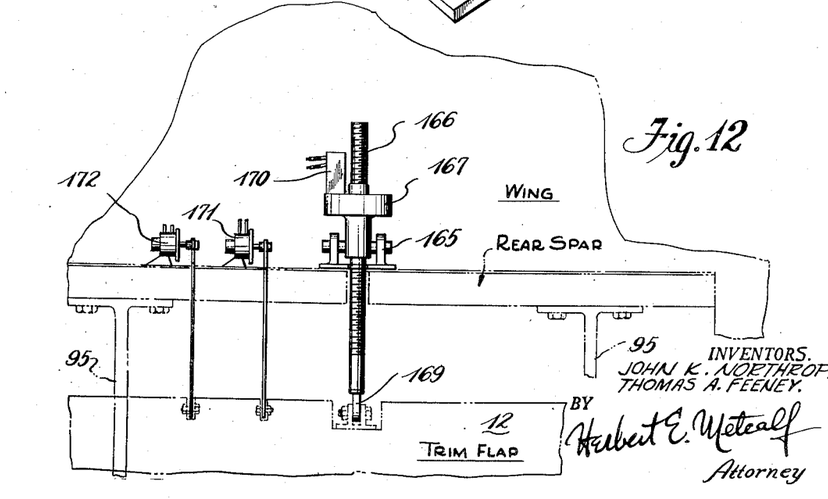
Figure 12 is a fragmentary plan view of a trim flap screw jack.

Referring to Figure 12, a trim flap actuator, preferably of the conventional electrically-driven screw jack type, is hinged to a bracket 165 affixed to the rear spar of the airplane. An actuator screw 166 of the ball bearing screw jack type passes through fitting 167 and is attached to bellcrank 169 extending from the trim flap axis. A geared nut (not shown) inside fitting 167 is rotated by a trim electric motor 170 and brake carried by the actuator fitting 167 to turn the jack screw nut in either direction as desired, thus moving the jack screw to rotate the trim flap. Position transmitters 171 and 172 are also attached to the flap and to the rear spar to indicate trim flap position.

Referring again to Figure 11, adjacent the pilot and in a side position to be easily reached by him and preferably operable by one hand and adjacent the high lift flap switch 160 is a trim flap control switch 175 constituting a secondary unitary control column or "stick," as it can be called, because the directional movements of the trim flap control standard are set up to be the same as the directional movements of a conventional airplane control stick. In consequence, this secondary column provides for substantially the same instinctive control movements as the main pilot's control, as stick column and wheel column operations are similar and airplane pilots have no difficulty in shifting from one to the other.

Secondary control column 175 operates as a small vertical hand switch 175a, about four inches high in the presently described installation, spring biased to be centralized unless positively displaced. The trim electric motors 170 are reversible and the operating connections therefor are connected to secondary control column contacts (not shown), so that the trim motors on opposite wing panels can be operated in the same or different directions according to the position of column 175 when moved away from neutral position. One simple form the switch 175a may take is shown diagrammatically in Figures 13 and 14.

Figure 13:
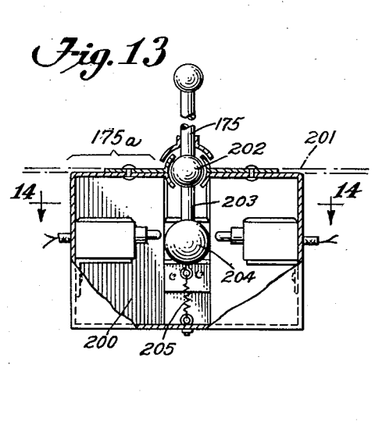
Figure 13 is a diagrammatic vertical sectional view of the secondary pilot control shown in Figure 11.

Here, a frame 200 is provided, attached to the top surface of switch housing 201, the secondary control column 175 passing through the housing 201 at a ball joint 202. Column 175 is continued below the top surface of the housing 201 as a column lever 203 terminating in a ball 204 inside of frame 200. A relatively strong centering spring 205 is attached to the bottom of ball 204 and to the bottom of frame 200 to hold the column lever 203 and the secondary control column 175 normally vertical.

Radially arranged at 90° intervals on frame 200 around ball 204 are four micro switches 206, 207, 208 and 209 each having an operating arm 210 extending toward but not touching ball 204. These switches are set so that a fore-and-aft line FA of the airplane passing through the center of ball 204 is spaced 45° from each switch.

As the movement of ball 204 is opposite to that of the secondary control column 175, the forward right switch 207 is connected to the left trim flap actuator motor 170 to move the left trim flap up when the micro switch 207 is closed. Similarly the forward left switch 206 is connected to the left trim flap actuator motor to move the left trim flap up.

The right rear switch 209 is connected to move the right trim flap down and the left rear switch 208 is connected to move the left trim flap down.

Thus as the ball moves to the rear (control column 175 forward) the operating arms 210 of both forward switches 206 and 207 will be contacted by the ball to close these switches and both left and right trim flaps are moved up, and a climbing moment is imposed on the airplane. Reverse movement of the ball 204 past neutral causes both trim flaps to move down.

When the ball is moved 90° to the right, the right forward and right rear switches 207 and 209, respectively, are operated to move the left trim flap up and the right trim flap down to produce a rolling moment on the airplane. Movement 180° opposite past neutral produces an opposite rolling moment. Diagonal movements of ball 204 will operate only one trim flap switch. Thus secondary column positions are provided to energize the proper trim flap motors to move the trim flaps simultaneously or independently upwardly or downwardly as desired, as shown in Figure 11, as follows:

*Position 1.*—Column forward—both trim flaps move downwardly producing a diving moment.

*Position 2.*—Column to the rear—both trim flaps move upwardly producing a stalling moment.

*Position 3.*—Column right—right trim flap moves upwardly, left trim flap moves downwardly producing roll to the right.

*Position 4.*—Column left—left trim flap moves upwardly, right trim flap moves downwardly producing roll to the left.

Positions 5, 6, 7, and 8 are intermediate conditions producing simultaneous pitch and roll in the directions indicated.

When the secondary column is released by the pilot the trim flaps will, due to their positive power operation and braking when the motor is de-energized, stay where they are placed, as neutralization of the column does not energize the trim flap actuating motors in the reverse direction. The pilot, in order to change trim flap positions as for example to neutralize them after removal of the trim disturbance, must move the column to motor reversing positions, again a conventional directional movement on his part, particularly as the airplane in most instances will be flying without excess compensation imposed on the pilot's main control system. Thus having once trimmed for a particular special condition, trim will be retained until changed by conditions or by the pilot.

In order to tell the pilot the position of the trim flaps 12 at all times, indicator dials 176 and 177 are provided in pilot view. The output of the two electrical position transmitters 171 (one for each trim flap) are connected to add for longitudinal trim indication, and the outputs of the two position transmitters (one for each trim flap) are connected to subtract for lateral trim indication and are preferably calibrated in degrees displacement.

The eight trim flap switch positions represent eight directions in which the airplane can be trimmed, and the trimming compensation is thus removed from the main pilot control system. For example, when the pilot is taking off or landing with the high lift flap wholly or partially down, the pilot will move the secondary control column to move both trim flaps to provide a normally nose-up position that will balance the diving moment of the lowered high lift flap. Similar movements of the secondary control column will take care of special trim in case of engine failure or load shift, for example. The main consideration in all cases is that the operation of the trim flaps can be easily accomplished by the pilot because the movement of the control for the trim flaps follows the pilot's normal control training, and that when special moments are corrected by the use of the trim flap control system the pilot is free to use his main control system with all compensating deflections having been removed therefrom.

While the secondary column 175 returns to neutral without returning the trim flaps to neutral, under normal use the secondary column is operated, not only in conventional directions but substantially in a conventional manner. For example, in broad terms, stick control in conventional airplanes in most cases moves the elevators and/or ailerons to place the plane in a desired attitude. When this attitude is reached the stick and the surfaces are substantially neutralized. Yet, except for small deviations due to the original self-stabilizing trimming of the airplane surfaces and displacement forces externally applied, the airplane remains in the attitude in which placed. If the control surface deflection were continually applied the attitude change would be continuous. The stick and surfaces must then be again moved and substantially neutralized to provide a new attitude for the airplane.

The secondary column 175 is operated in exactly the same manner for trim. When a trim disturbing moment, for example, tends to cause the airplane to dive, the secondary column is moved to the rear until the trim flap displacement brings the airplane level. Then the secondary column is released and the airplane remains level until trim is again disturbed. The trim flaps do not return to neutral, but their deflection does not cause a continuous change of attitude because they are balancing out an opposite moment. When the trim disturbing moment is removed, the stick is again moved in a conventional manner to restore trim, and if no trim disturbing moments are present, stick neutral can, of course, correspond to trim flap neutral. Thus it is clear that while secondary control column 175 can return to neutral position without returning the trim flaps to neutral, the operation for compensation for trim disturbing moments is completely conventional. If, as in an emergency, the trim flaps are used for full or partial airplane control, the movements of the secondary control column will still be made in conventional directions, but the manner of use will differ slightly from conventional movements in that the secondary column will be moved through neutral to a reverse position to neutralize the flaps after a desired attitude has been attained. It has been found that this type of operation is readily understood and instinctively performed by pilots.

It will be noted that irrespective of the positions of the trim flaps the rudder flaps carried thereon are still operable and still effective to directionally control the airplane or to produce braking drag in landing.

The above description of a practical example of the application of the present invention to a tailless airplane clearly indicates that full and safe control of tailless airplanes can be obtained by the use of trailing edge surfaces only, and that such control is obtained by the pilot without having to learn new control procedures, or to make control movements counter to his training in the operation of conventional control systems on conventional airplanes. Pilots trained on conventional tail type airplanes have satisfactorily taken off, flown, and landed tailless airplanes equipped with substantially the presently described control system, fully power operated, without previous experience in the piloting of such airplanes, and without any previous flight training whatsoever in tailless airplanes.

It is to be noted that the system just described is shown for single pilot operation. The customary duplication of controls for co-pilot use has not been illustrated for the sake of clarity, but in most cases, particularly for large tailless planes, the main elevon control and the rudder pedals are duplicated for the co-pilot's use. Under these circumstances, in most cases the secondary pitch and roll control system can be placed where it can be readily reached by the right hand of one pilot and the left hand of the other pilot. However, duplication of the secondary trim flap control system, in case the pilots are separated, is obviously simple.

We claim:

1. In a tailless airplane having an extended trailing edge, control surfaces forming portions of said trailing edge comprising a pair of elevons symmetrically positioned on each side of the center of said trailing edge, a pair of trim flaps symmetrically positioned adjacent said elevons and outboard thereof and capable of upward and downward movement, a pair of drag flaps mounted on each of said trim flaps capable of being separated and forming a part of the trailing edge of each trim flap when closed, right and left pilot operable rudder bars connected to separate the drag flaps on the respective trim flaps, a primary pilot operable pitch and roll control comprising a primary control column connected to move said elevons simultaneously upwardly and downwardly, and also connected to move said elevons in opposite sense to control said airplane by conventional piloting movements, and a secondary pilot operable pitch and roll control comprising a power actuator of the locking type for each of said trim flaps and connected to move said trim flaps upwardly or downwardly in accordance with directional energization of said actuators, a secondary pitch and roll control column having a neutral position and movable radially therefrom to a plurality of circumferentially spaced positions, power actuator energizing means positioned at each of said positions and operated only when said secondary control column is moved to said positions by the pilot, and elastic means normally centering said control column to deenergize said power actuators, each of said power actuator energizing means being connected to said power actuators to move both of said trim flaps in directions providing airplane controlling forces conventional with respect to the direction of movement of said secondary control column away from neutral, whereby trim can be achieved by instinctive pilot control of said secondary control column during the piloting of said airplane by use of said primary control column and rudder bars, thereby removing trimming displacements from these latter controls.

2. Apparatus in accordance with claim 1 wherein said trim flap power actuators are constant speed devices and wherein said power actuator energizing means are on-off controls whereby said trim flaps are moved at a fixed rate of speed.

3. Apparatus in accordance with claim 1 wherein indicator means are provided adjacent said secondary control column for indicating to the pilot the relative position of said trim flaps with respect to said airplane.

4. Apparatus in accordance with claim 1 wherein the secondary control column is mounted to provide movement in eight radial directions and wherein said power actuator energizing means are connected to said actuators to move said trim flaps as follows:

*Position 1.*—Column forward—both trim flaps move downwardly to produce a diving moment.

*Position 2.*—Column to the rear—both trim flaps move upwardly to produce a stalling moment.

*Position 3.*—Column right—right trim flap moves upwardly, left trim flap moves downwardly to produce roll to the right.

*Position 4.*—Column left—left trim flap moves upwardly, right trim flap moves downwardly to produce roll to the left, and wherein Positions 5, 6, 7, and 8 are intermediate positions producing simultaneous pitch and roll.

5. In a tailless airplane having an extended trailing edge, control surfaces forming portions of said trailing edge comprising a pair of elevons symmetrically positioned on each side of the center of said trailing edge, a pair of trim flaps symmetrically positioned adjacent said elevons and outboard thereof and capable of upward and downward movement, a pair of drag flaps mounted on each of said trim flaps capable of being separated and forming a part of the trailing edge of each trim flap when closed, a symmetrical centrally located high lift flap capable of downward movement, right and left pilot operable rudder bars connected to separate the drag flaps on the respective trim flaps, pilot operable power means connected to lower and raise said high lift flap, a primary pilot operable pitch and roll control comprising a primary control column connected to move said elevons simultaneously upwardly or downwardly, and also connected to move said elevons in opposite sense to control said airplane by conventional piloting movements, and a secondary pilot operable pitch and roll control comprising a power actuator of the locking type for each of said trim flaps and connected to move said trim flaps upwardly or downwardly in accordance with directional energization of said actuators, a secondary pitch and roll control column having a neutral position and movable radially therefrom to a plurality of circumferentially spaced positions, power actuator energizing means positioned at each of said positions and operated only when said secondary control column is moved to said positions by the pilot and elastic means normally centering said control column to deenergize said power actuators, each of said power actuator energizing means being connected to said power actuators to move both of said trim flaps in directions providing airplane controlling forces conventional with respect to the direction of movement of said secondary control column away from neutral, whereby trim can be achieved irrespective of the position of said high lift flap or the separation of said drag flaps by instinctive pilot control of said secondary control column during the piloting of said airplane by use of said primary control column and rudder bars, thereby removing trimming displacements from these latter controls.

6. Apparatus in accordance with claim 5 wherein said trim flap power actuators and said power means for lowering and raising said high lift flap are constant speed devices operating at speeds related to the moment effect of their respective connected surfaces on said airplane to provide movement of said surfaces at speeds substantially balancing each others pitching moments to prevent excessive trimming displacements of said primary control column, and wherein said power actuator energizing means are on-off controls.

7. Apparatus in accordance with claim 5 wherein indicator means are provided adjacent said secondary control column for indicating to the pilot the relative position of said trim flaps with respect to said airplane.

JOHN K. NORTHROP.
THOMAS A. FEENEY.

REFERENCES CITED

The following references are of record in the file of this patent:

UNITED STATES PATENTS

| Number | Name | Date |
|---|---|---|
| 1,707,690 | Sperry | Apr. 2, 1929 |
| 1,729,850 | Wunsch | Oct. 1, 1929 |
| 2,173,538 | McKellar | Sept. 19, 1939 |
| 2,191,842 | Back | Feb. 27, 1940 |
| 2,354,042 | Munk | July 18, 1944 |
| 2,393,892 | De Ganahl | Jan. 29, 1946 |
| 2,397,978 | Paulus et al. | Apr. 9, 1946 |
| 2,412,647 | Northrop et al. | Dec. 17, 1946 |
| 2,445,343 | Tyra | July 20, 1948 |

FOREIGN PATENTS

| Number | Country | Date |
|---|---|---|
| 557,259 | Great Britain | Nov. 12, 1943 |
| 574,151 | Great Britain | Dec. 21, 1945 |